May 19, 1964 M. A. REMKE ETAL 3,133,437
MEASURING THE WATER CONTENT IN OIL AND WATER MIXTURES
Filed May 22, 1961 2 Sheets-Sheet 1

INVENTORS
M.A. REMKE
L.E. KUNTZ
BY Hudson & Young
ATTORNEYS

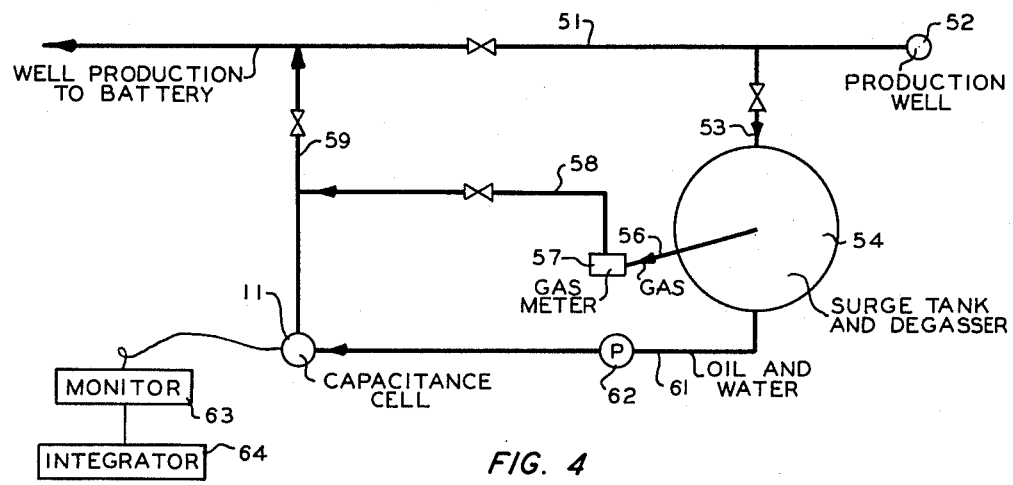
FIG. 4
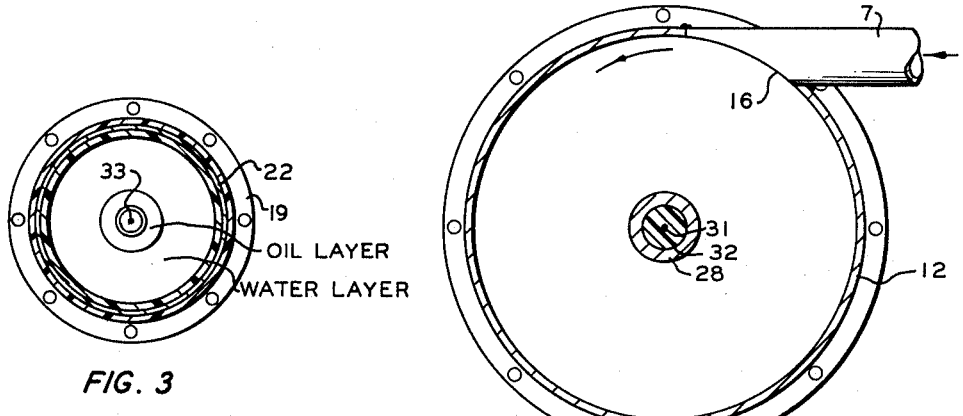
FIG. 3
FIG. 2
INVENTORS
M.A. REMKE
L.E. KUNTZ
BY Hudson E. Young
ATTORNEYS United States Patent Office 3,133,437
Patented May 19, 1964

3,133,437
MEASURING THE WATER CONTENT IN OIL AND WATER MIXTURES
Marvin A. Remke and Louis E. Kuntz, Bartlesville, Okla., assignors to Phillips Petroleum Company, a corporation of Delaware
Filed May 22, 1961, Ser. No. 111,749
11 Claims. (Cl. 73—53)

This invention relates to a method and apparatus for measuring the composition of immiscible hydrocarbon and water mixtures. In another aspect, it relates to a method and apparatus for measuring the water content of oil and water mixtures, such as the production fluid obtained from oil wells. In another aspect, it relates to a method and apparatus for measuring the amount of water (or B.S. & W.) and oil in production fluid flowing in a pipeline from an oil well or from a treater or separator.

The production fluid of an oil well often contains water in addition to oil and gas. The gas is separated from the production fluid by a separator and the oil and water mixture passed to other separation equipment. In order to efficiently produce the well and handle the production fluid, it becomes necessary to accurately measure the water content of the production fluid. For example, when an oil well produces water (usually referred to as "B.S. & W.," basic sediment and water in an excessive amount) it may be necessary or desirable to plug the well, or to send the production fluid back to the treater or storage tank. As such, the measurement of the water content must be accurate and reliable, otherwise the well may be plugged back unnecessarily or the production fluid unnecessarily sent back to the treater or separator.

A number of means and procedures have been proposed, patented, or used for determining the water content of production fluid. Some of these depend upon periodic sampling of production fluid and visual reading of the water volume. Other means, though somewhat automatic, do not give an accurate and representative analysis over long periods of time. Still other prior art systems are unsatisfactory because they are adversely affected by the buildup of sludge, while others are limited in utility to water-in-oil mixtures and are sensitive only up to 50 or 60 volume percent water. Thus, there has arisen a need for an improved means and procedure for efficiently, accurately, and reliably measuring the water content of oil and water mixtures.

Accordingly, an object of this invention is to provide an improved method and apparatus for monitoring and/or measuring the composition of immiscible hydrocarbon and water mixtures. Another object is to provide an improved method and apparatus for measuring the water content of oil and water mixtures, such as the production fluid obtained from oil wells. Another object is to provide an improved method for measuring the amount of water (or B.S. & W.) of oil well production fluid flowing in a pipeline from an oil well or from a treater or separator. Another object is to provide an improved method and apparatus for measuring the water content of oil and water mixtures notwithstanding changes in the water content, water contents approaching 100 volume percent, or the fact that the water component forms the continuous phase. Other objects and advantages of this invention will become apparent to those skilled in the art from the following discussion, appended claims, and accompanying drawing in which:

FIGURES 2 and 3 are cross-sectional views of FIGURE 1 taken along the planes indicated; and FIGURE 4 is a plan view illustrating the applicability of our invention in conjunction with the production line of an oil well.

Figure 1:
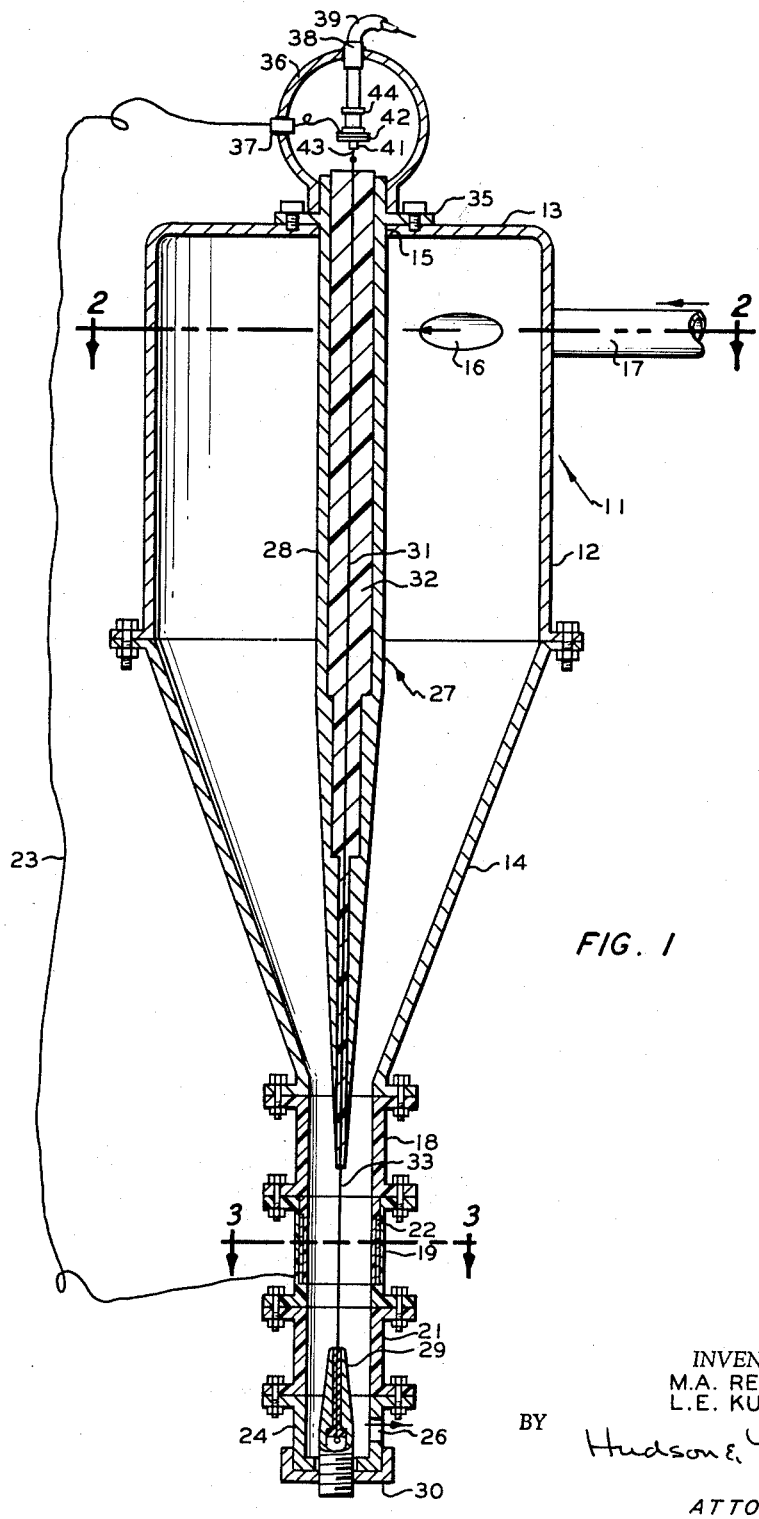
FIGURE 1 is an elevational, cross sectional view of a novel device constructed according to our invention.

Illustrative of the broader aspects of our invention, we propose to measure the water content (and thereby the oil content by difference) of an oil and water mixture by passing a stream of the same to a novel device, such as illustrated by the preferred embodiments of FIGURES 1–3, where centrifugal motion is imparted to the stream to effect substantially complete separation of the oil and water phases, and measuring the dielectric constant of the thus separated mixture, the dielectric constant being an index of the water content (or B.S. & W.) of the stream. Said centrifugal motion can be imparted to the stream by introducing it tangentially into a cylinder or by introducing it into the top of a rotating cylinder, or any like means for imparting centrifugal motion to a liquid.

Our invention can be used to monitor and/or measure the composition of liquid hydrocarbon-water mixtures in general, as long as the components of the composition are immiscible and have different gravities and dielectric constants, and regardless of whether in such mixtures the water component forms the continuous or discontinuous phase.

A fuller understanding of our invention will be gained from the following discussion and the accompanying drawing. In FIGURE 1, a device hereinafter referred to as a cyclone is generally designated 11. Cyclone 11 preferably comprises an upper cylindrical housing 12, the top 13 of which is closed, and a tapered or truncated housing 14, the upper end of which is opened and integral with cylindrical housing 12 or separate and connected thereto by means of bolted flanges. Cylindrical housing 12 has a central opening 15 in its top 13 and a tangential opening 16 adjacent the upper end of its side wall. A pipe 17 communicates with tangential opening 16 to supply the cyclone with a stream of an oil and water mixture. Tangential introduction of the mixture into the cyclone 11 imparts centrifugal motion to the stream and the consequent separtion of the two phases, the water phase being thrown against the inner periphery of the housing and the oil phase being located in the center of the housing. Alternatively, in place of the tangential inlet 16 and pipe 17, we can inject the oil and water mixture into the top of cyclone 11 and by means which will be apparent to those skilled in the art rotate cylinder 11, or rotate either or both of housing members 12 and 14, and thereby impart the necessary centrifugal force.

The lower end of tapered housing 14 is connected to cylinders 18, 19, and 21 made of electrical insulation material having a high, stable or constant dielectric constant, such as Lucite $^R$ and Marlex $^R$, or other similar plastics. The middle cylinder 19, hereinafter called the capacitance cell or capacitor, has embedded in it a cylindrical sleeve 22 made of metal, such as stainless steel. The metal sleeve 22 serves as one plate or electrode of capacitor 19, and it will be hereinafter referred to as the cylindrical electrode. The latter is connected to a ground wire 23 which passes through a hole in the lower end of cylinder 19. The lower end of cylinder 21 is connected to a cap 24 which has an opening or outlet 26 for the withdrawal of the oil and water mixture from the lower end of the cyclone 11.

Axially supported within cyclone 11 is a cylindrical probe generally designated 27, comprising an upper probe portion 28 and a lower probe portion 29. Probe portion 28 extends upwardly through opening 15 of housing 12 and is supported on the top 13 thereof by means of a bolted flange 35. Probe portion 29 can extend downwardly through an opening in cap 24 and can be secured thereto by means of a threaded nut 30 as shown. Running axially through probe 27 is an electrical conducting wire 31 which is insulated from probe portions 28, 29 by a cylindrical layer of electric insulation material 32 having a constant dielectric constant, such as high density polyethylene, e.g., Marlex$^R$, or polytetrafluoroethylene, e.g., Teflon$^R$. Probe portion 28 is preferably tapered and its lower end terminates at a point removed from capacitor 19. The portion of the conductive wire 31 which axially passes through capacitor 19 is designated 33. Wire portion 33 functions as the other plate or electrode of capacitor 19, and it is hereinafter referred to as the center electrode. With cylinders 18, 19 and 21 made of electric insulation material, and the adjacent ends of probe portions 28, 29 terminated as shown, stray dielectric constant effects of the metallic parts of the device are prevented from affecting the dielectric constant measurements to be made by capacitor 19.

The protruding upper end of probe portion 28 is preferably connected to suitable junction box 36, such as a Condulet, Type GUAC, described in Catalog No. 3400 of the Crouse-Hinds Company. Junction box 36 has a fitting 37 in its wall to permit the entry of ground wire 23 and another fitting 38 to permit the entry of a coaxial cable 39. A post 41 is maintained within junction box 36 on a bracket 42. Post 41 has a centrally insulated electric wire 43 which is connected to the upper end of wire 31 of probe 27. The upper end of the ground wire 23 is in electrical contact with bracket 42, which in turn is in electrical contact with the outer metal sleeve of post 41. The coaxial cable 39 has a head 44 which is adapted to slip over post 41, for example by means of a bayonet fit, so that the center wire of the coaxial cable is in electrical contact with wire 31 of probe 27 and the insulated conducting sleeve of the coaxial cable is in electrical contact with ground wire 23. It should be apparent that any other type of junction box can be used without departing from the scope and spirit of this invention.

In operation, a stream of an oil and water mixture is injected into the upper end of cyclone 11, via inlet 16 and pipe 17, preferably at a constant rate of flow. Because of this tangential introduction, centrifugal motion is imparted to the thus introduced mixture, causing the water phase to be thrown out against the inner periphery of the cyclone and the oil phase to be located as a sheath or in the form of a cylinder around probe 27. The centrifugally whirling mixture gravitates through tapered housing 14, the velocity of the mixture increasing. The centrifugally moving stream passes through cells 18, 19, and 21 and finally out through outlet 26 of cap 24. Capacitor 19 is disposed at that point of highest velocity, and the oil phase will be in contact with the center electrode 33 while the water phase will be disposed adjacent cylindrical electrode 22. The capacitor 19 thus measures the dielectric constant of the separated mixture passing through it, and since the dimensions of the capacitor do not change, the measured dielectric constant is directly proportional to the capacitance of the capacitor 19.

Crude oil has a dielectric constant of about 2 to 2.3, while water has a dielectric constant of about 80. Where water is present in the stream introduced into the cyclone 11, the dielectric constant of the mixture passing through capacitor 19 will become greater, the dielectric constant increasing about 3 percent for each volume percent of water. Thus, if the water or B.S. & W. content of the mixture increases, the measured dielectric constant of the mixture increases. Since by the practice of our invention the oil and water phases will be substantially completely separated, there is no continuous path from the center electrode 33 to the cylindrical electrode 22. We are thus able to accurately detect the water content over a wide range, including mixtures where the water content approaches 100 volume percent. Such mixtures can be either water-in-oil mixtures or oil-in-water mixtures.

The output from the capacitor 19 is transmitted to a suitable meter designed to convert the dielectric constant measurement into volume percent water or volume percent B.S. & W. Suitable meters which can be used for this purpose include Dielectric Meter, Model T.D.M., made by the United Engineers, Inc., and B.S. & W. Monitor, Type 4450 Transmitter, described in Bulletin 0–4500 of the Fisher Governor Company. These monitors detect small capacitance changes and will provide a continuous indication of the water or B.S. & W. content. Such monitor readings can be transmitted to a suitable integrator or averager, such as an Averager Computer made by Computers, Inc. Such an averager receives the dielectric constant monitor output and converts it to a pulse rate corresponding to the monitor output. The B.S. & W. pulses are accumulated on an electric impulse counter, and time is registered in hundredths of minutes. At any instant the average percent B.S. & W transferred since the registers were set to zero is the quotient of the B.S. & W. register divided by the time register. Thus, the dielectric constant monitor reading is integrated with respect to time to give the percent volume of B.S. & W. A summation of instantaneous monitor readings of a period of time from $T_1$ to $T_2$ divided by time $T_2-T_1$, in appropriate units, will give the average percent B.S. & W. during the period of monitoring so long as the flow rate of the mixture introduced into the cyclone 11 is constant. Alternatively, the dielectric constant monitor reading can be integrated with respect to the flow rate of the mixture, where such flow rate is variable, to give the average percent B.S. & W. during the monitoring or testing period.

FIGURE 4 illustrates the applicability of our invention, specifically the cyclone device of FIGURES 1–3, in conjunction with the production line 51 of an oil well 52. The production fluid is withdrawn from production line 51 via line 53 and where gas is present in the production fluid the production fluid is transferred to a surge tank or degasser 54. The degasser 54 separates gas from the oil and water mixture and the gas can be withdrawn from the top via line 56, passed through a gas meter 57, and thence via line 58 to the atmosphere or storage, or via lines 58, 59 back to production line 51. The oil and water mixture is passed via line 61, for example from the lower end of degasser 54, through a meter pump 62, and thence to the novel cyclone means 11 of our invention. As the dielectric constant of the oil and water mixture is measured by means 11, the mixture is passed via line 59 to a treater or separator, or back to line 51. The output from the capacitor 19 of means 11 is transmitted to dielectric constant monitor 63, and the output from the latter transmitted to integrator 64. The degasser 54, gas meter 57, meter pump 62, cyclone 11, monitor 63, and integrator 64 can all be mounted in a small pick-up truck or the like, and the whole combination used as a portable well testing unit.

From a knowledge of the B.S. & W. content, the oil content of the mixture can be computed by difference. These data, coupled with the data provided by gas meter 57 and meter pump 62, are used to determine the composition of the production fluid in line 51. For example, if the dielectric constant of the oil and water mixture of the production fluid is continuously measured over a 12 hour period, and gas meter 57 registers 2 MMCF of gas during this period, meter pump 62 registers 1000 barrels of oil and water mixture over this period, and integrator 64 indicates that the average percent B.S. & W. over this period is 60 volume percent, the amount of water which has been transferred in this period is equal to 1000 barrels multiplied by 0.6 or is equal to 600 barrels, and the amount of oil transferred during this period is equal to 1000 barrels minus 600 barrels of water, or is equal to 400 barrels of oil.

The applicability and utility of our invention in a variety of operations should become apparent to those skilled in the art. Although we find that our invention is particularly designed primarily for the measurement of the water content (or B.S. & W.) in crude oil, it can be modified for many other applications suitable for detection of component changes in a great number of types of fluids. For example, it can be used in conjunction with lease automatic custody transfer operations. Another type of application is that of interface detection when pumping successive productions through a pipeline. Many other applications will become apparent to those skilled in the art.

Thus, it should be understood that the subject invention is not to be limited unduly to that set forth herein for illustrative purposes, since various modifications and alterations will become apparent to those skilled in the art without departing from the spirit and scope of this invention.

We claim:

1. A method of detecting component changes in a mixture of hydrocarbon and water components having different gravities and dielectric constants, which comprises imparting centrifugal motion to a stream of said mixture to cause a separation of said components thereof, passing the resulting separated mixture through a capacitor cell with the electrodes thereof so disposed that there is no continuous electrically conductive path therebetween across said resulting separated components, and measuring the dielectric constant of said separated mixture in said capacitor cell.

2. A method of measuring the water content of a mixture of oil and water, which comprises imparting centrifugal motion to a stream of said mixture to cause a separation of said oil and water components, passing the separated mixture through a capacitor cell with one electrode thereof disposed in the center of said cell and in the resulting separated oil component and the other electrode of said cell disposed in spaced relationship with said one electrode with said separated components between said electrodes, measuring the dielectric constant of said separated mixture in said cell as an index of the water content of said stream, and recombining said separated components after passage of the same through said cell.

3. The method according to claim 2 wherein said mixture is a water-in-oil mixture.

4. The method according to claim 2 wherein said mixture is an oil-in-water mixture.

5. A method of determining the composition of oil well production fluid comprising gas, oil, and water, which comprises separating said gas from the oil and water components of said production fluid, measuring the flows of the resulting separated gas stream and the stream of oil and water mixture, imparting centrifugal motion to said stream of oil and water mixture to cause a separation of said oil and water components thereof, passing the resulting separated mixture of oil and water through a capacitor cell with one electrode thereof disposed in the center of said cell and in the resulting separated oil component and the other electrode of said cell disposed in spaced relationship with said one electrode with said separated components between said electrodes, measuring the dielectric constant of said separated mixture in said cell as an index of the water content of said mixture, determining the composition of said production fluid from said flows and dielectric constant, and recombining said separated components after passage of the same through said cell.

6. Apparatus comprising a housing, means to introduce a stream of a hydrocarbon-water mixture into one end of said housing so as to impart centrifugal motion to said mixture within said housing, means to withdraw said mixture from said housing at another end thereof, and a capacitance cell so disposed that the resulting separated oil and water mixture withdrawn from said housing passes through said cell with one electrode thereof disposed in the center of said cell and in the resulting separated hydrocarbon component and the other electrode of said cell disposed in spaced relationship with said one electrode with said separated components between said electrodes.

7. Apparatus comprising a housing, means to tangentially introduce a stream of an oil and water mixture into one end of said housing so as to impart centrifugal motion to said mixture within said housing and cause the separation of the oil and water components of said mixture, and means to withdraw the resulting separated mixture from said housing at another end thereof, the latter means including a capacitance cell through which the resulting separated oil and water mixture passes with one electrode thereof disposed in the center of said cell and in the resulting separated oil component and the other electrode of said cell disposed in spaced relationship with said one electrode with said separated components between said electrodes.

8. Apparatus comprising a housing, means to introduce a stream of a hydrocarbon-water mixture into one end of said housing so as to impart centrifugal motion to said mixture within said housing, means to withdraw said mixture from said housing at another end thereof, and a capacitance cell so disposed that the resulting separated oil and water mixture withdrawn from said housing passes through said cell, said cell comprising a cylinder of material having a constant dielectric constant, an electrode embedded in the wall of said cylinder, and an electrode axially depending in said cell.

9. Apparatus for determining the composition of oil well production fluid, comprising conduit means for passing a stream of said production fluid to degassing means, gas meter means for measuring the flow of separated gas withdrawn from said degassing means, meter pump means to measure the flow of separated oil and water mixture withdrawn from said degassing means, a capacitance device, conduit means to supply said separated oil and water mixture to said capacitance device, the latter comprising a housing, means to introduce said mixture into one end of said housing so as to impart centrifugal motion to said mixture within said housing, means to withdraw said mixture from said housing at another end thereof, and a capacitance cell so disposed that the resulting separated oil and water mixture withdrawn from said housing passes through said cell with one electrode thereof disposed in the center of said cell and in the resulting separated oil component and the other electrode of said cell disposed in spaced relationship with said one electrode with said separated components between said electrodes.

10. Apparatus for determining the composition of oil well production fluid, comprising conduit means for passing a stream of said production fluid to degassing means, gas meter means for measuring the flow of separated gas withdrawn from said degassing means, meter pump means to measure the flow of separated oil and water mixture withdrawn from said degassing means, a capacitance device, conduit means to supply said separated oil and water mixture to said capacitance device, the latter comprising a housing, means to tangentially introduce said mixture into one end of said housing so as to impart centrifugal motion to said mixture within said housing and cause the separation of the oil and water components of said mixture, and means to withdraw the resulting separated mixture from said housing at another end thereof, the latter means including a capacitance cell through which the resulting separated oil and water mixture passes with one electrode thereof disposed in the center of said cell and in the resulting separated oil component and the other electrode of said cell disposed in spaced relationship with said one electrode with said separated components between said electrodes.

11. Apparatus according to claim 10 further comprising monitor means connected to said capacitance cell and providing a continuous indication of the water content of said production fluid, and averager means connected to said monitor means to integrate the monitor reading with respect to time to give the average water content of said production fluid.

References Cited in the file of this patent

UNITED STATES PATENTS

| | | |
|---|---|---|
| 2,082,299 | Nonhebel et al. | June 1, 1937 |
| 2,306,606 | Hirsch | Dec. 29, 1942 |
| 2,565,343 | Benham | Aug. 21, 1951 |
| 2,720,624 | Gunst et al. | Oct. 11, 1955 |
| 3,003,106 | Vesper et al. | Oct. 3, 1961 |